US006206148B1

(12) United States Patent
Capek et al.

(10) Patent No.: US 6,206,148 B1
(45) Date of Patent: Mar. 27, 2001

(54) DRUM BRAKE WITH DUO-ACTUATION

(75) Inventors: Joseph Carl Capek, Granger; Norman Lee Hostetler, Walkerton, both of IN (US)

(73) Assignee: Robert Bosch Corporation

( * ) Notice: Subject to any disclaimer, the term of this patent is extended or adjusted under 35 U.S.C. 154(b) by 0 days.

(21) Appl. No.: 09/239,183

(22) Filed: Jan. 29, 1999

(51) Int. Cl.[7] .................................................. F16D 51/00
(52) U.S. Cl. ..................... 188/79.51; 188/327; 188/328
(58) Field of Search ............................... 188/106 F, 327, 188/328, 79.51, 79.54, 79.55, 79.56, 79.63, 79.64, 2 D, 196 BA

(56) References Cited

U.S. PATENT DOCUMENTS

| | | | |
|---|---|---|---|
| 3,941,218 | * | 3/1976 | Torii ................................. 188/106 F |
| 5,002,159 | * | 3/1991 | Brix et al. ............................ 188/2 D |
| 5,029,676 | * | 7/1991 | Yamamoto ........................ 188/79.54 |
| 5,058,713 | * | 10/1991 | Evans ................................. 188/79.54 |
| 5,092,428 | * | 3/1992 | Kobayashi et al. ............... 188/106 A |
| 5,180,037 | * | 1/1993 | Evans ................................. 188/70 R |

FOREIGN PATENT DOCUMENTS

| | | | |
|---|---|---|---|
| 816706 | * | 7/1998 | (EP) . |
| 8303492 | * | 11/1996 | (JP) . |
| 10299801 | * | 11/1998 | (JP) . |

* cited by examiner

Primary Examiner—Christopher P. Schwartz
Assistant Examiner—Xuan Lan Nguyen

(74) Attorney, Agent, or Firm—Leo H McCormick, Jr.; Warron Comstock

(57) ABSTRACT

A drum brake assembly (10) having first (12) and second (14) brake shoes retained on a backing plate (16). The first (12) and second (14) brake shoes have a first end (22,24) aligned on a hydraulic actuator assembly (26) and a second end (28,30) aligned on an anchor block (40). An adjustable strut mechanism (32) has an extendable shaft (33) with first end member (34) which engages the first brake shoe (12) and a second end member (36) which engages the second brake shoe (14). The first end member (34) is separated from the second end member (36) by a stem member (35). Stem member (35) has a threaded first end (39) which is mated with the second end member (36) and a smooth second end (31) which is retained in a bore of the first end member (34). The first (12) and second (14) brake shoes are urged toward the hydraulic actuator assembly (26) by a first resilient member (150) and toward the anchor block (40) by a second resilient member (48). The length of the extendable shaft (33) is adjusted by ratcheting a pawl (65) to rotate stem member (35) and establish a predetermined running clearance between the first (42) and second (44) friction pads and drum (46). The hydraulic actuator assembly (26) responds to a first input to respectively move first (42) and second (44) friction pads associated with first (12) and second (14) brake shoes into engagement with a drum (46) and effect a service brake application. A mechanical actuator (50) has a lever (52) which is pivotally connect to an arm (80) that extends in a perpendicular plane from the second end (36) of the extendable shaft (33). An input applied to lever (52) caused end (56) to pivot on arm (80) and axially move the first end member (34) of the extendable strut (33) toward web (13) while variable surface (58) moves toward web (15) and thereby brings the first (42) and second (44) friction pads into engagement with a drum (46) to effect a parking brake application.

5 Claims, 2 Drawing Sheets

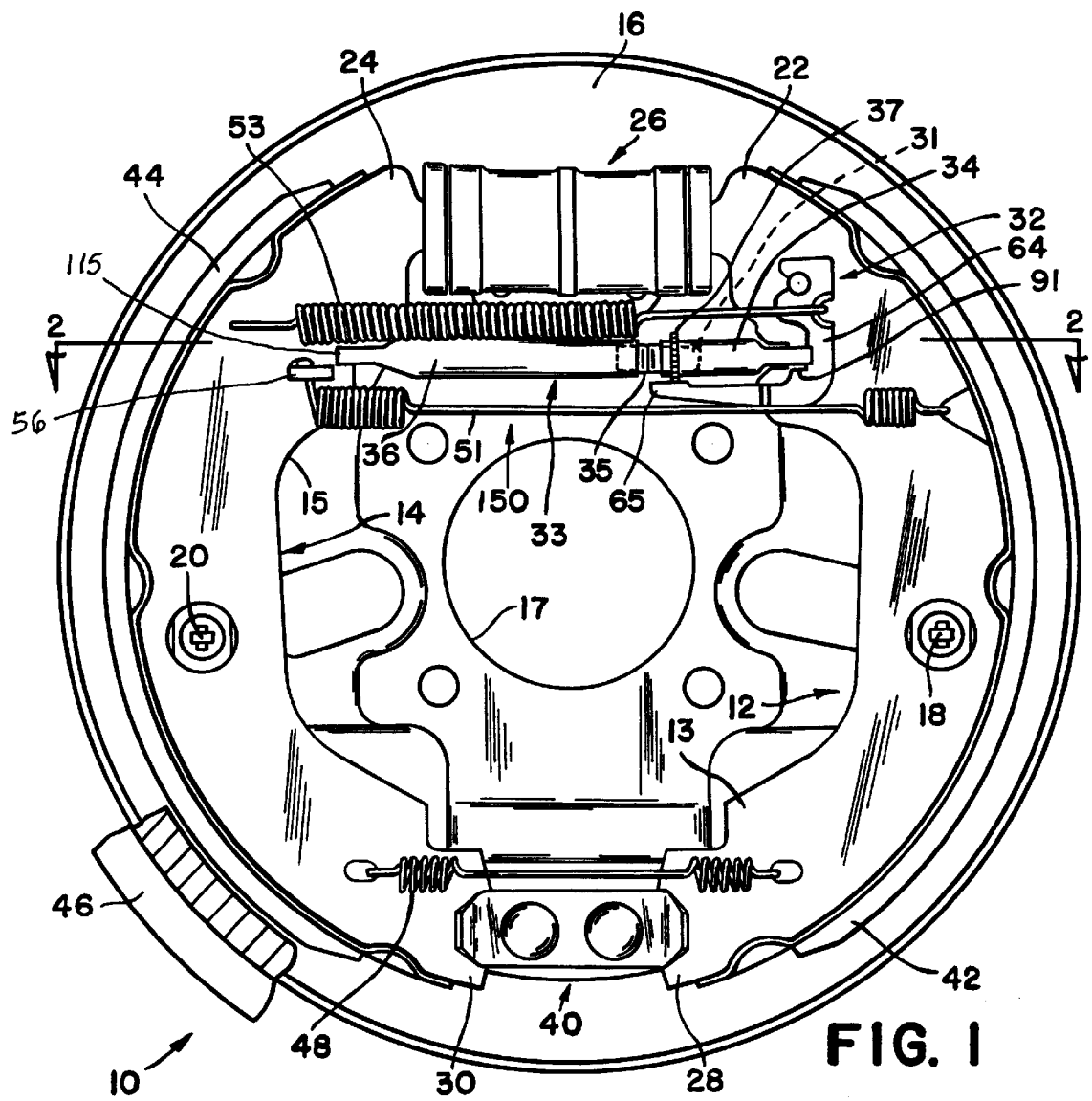
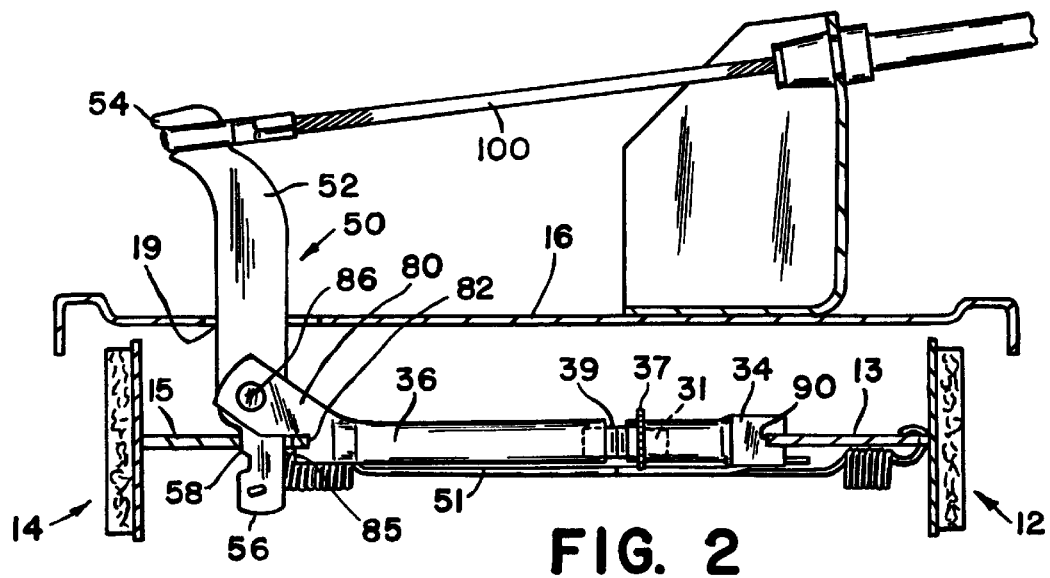

DRUM BRAKE WITH DUO-ACTUATION

This invention relates to a drum brake having a duo mode of operation. In a service mode, a hydraulic actuator moves brake pads into engagement with a drum to effect a first brake application and in a parking brake mode, a mechanical operated lever pivots on an extendible shaft of an adjustable strut to move brake pads into engagement with the drum and effect a second brake application.

BACKGROUND OF THE INVENTION

Duo-mode drum brakes of a type disclosed in U.S. Pat. Nos. 4,249,646 and 4,364,456 are frequently used in combination on vehicles having front wheel disc brakes. For parking brake functions, the disc brake is mechanically actuated by applying a force through a lever arm which is carried on a web of a brake shoe. The lever arm has a first end which is pivotally attached to the web and a second end which is linked to a cable located adjacent a pivot block. The cable typically being attached to the second end in a manner as disclosed in U.S. Pat. No. 5,706,914. The mechanical actuation of this type drum brake is capable of providing sufficient braking force for parking and is adequate for most applications, however, the cost associated with manufacturing has resulted in customers requesting an alternate for implementing the function of a parking brake. In-addition when this type brake is used on vehicles identified as sport-utility models it is desirous to have all components as far away from the ground as possible to avoid the engagement with sand, rocks, stumps, and non-level ground.

In an effort to develop a robust brake for the rear of a front wheel drive vehicle it has been proposed to use disc brakes on all of the wheels and provide for a parking brake function through a drum brakedisc brake, as disclosed in U.S. Pat. Nos. 5,180,037 and 5,529,149 and commonly referred to as drum-in-hat. The drum brake being actuated through a scissors arrangement in responds to mechanical input. This arrangement performs in an adequate manner but the cost and weight has resulted in some manufacturers looking for a low cost and light-weight brake.

SUMMARY OF THE INVENTION

On review of the use and performance required for braking a front wheel driven vehicle or a rear wheel drive on an all wheel drive vehicle, it was determined that a drum brake could meet the operational requirements and the parking brake function could be achieved through the duo-use of the drum brake. In the present invention, a drum brake assembly having first and second brake shoes is retained on a backing plate by first and second pins. Each of the first and second brake shoes has a first end aligned on an anchor block and a second end connected to a hydraulic actuator assembly. An adjustable strut mechanism located between the first and second brake shoes has a extendable shaft with a first end that engages the first end of the first brake shoe and a second end that engages the first end of the second brake shoe. A first resilient member urges the first and second brake shoes toward the hydraulic actuator assembly and second resilient member urges the first and second brake shoes toward the anchor block. The length of the extendable shaft is periodically adjusted by the operation of a ratchet pawl to establish a predetermined running clearance between the first and second friction pads and drum. The hydraulic actuator assembly responds to a first input to respectively move first and second friction pads associated with the first and second brake shoes into engagement with a drum and effect a first brake application during the service mode of operation. A mechanical actuator has a lever, which extends through the backing plate adjacent the hydraulic actuator, is pivotally connect to an arm that extends from the extendable shaft. The lever has a variable surface which is connected to the web of the second brake shoe. A second input applied to lever is axially applied to the first and second brake shoes through the extendable shaft to correspondingly move the first and second friction pads associated with the first and second brake shoes into engagement with a drum to effect a second brake application during the parking brake mode of operation.

An advantage of the present invention resides in a mechanical actuator which is positioned on an extendable shaft associated with an adjustable strut to provide an input to effect a parking brake function of a vehicle.

A further advantage of this invention is to provide a drum brake with a duo-mode of actuation whereby a service brake is converted to a parking brake by substituting a manual input through a lever carried on a adjustable strut which maintains a desired running clearance.

BRIEF DESCRIPTION OF THE DRAWINGS

FIG. 1 is a schematic front illustration of a drum brake with an adjuster mechanism and a high entry lever arrangement made according to the present invention to provide for mechanical engagement of brake pads with a drum to effect a parking brake application;

FIG. 2 is a sectional view taken along line 2—2 of FIG. 1 illustrating lever and adjuster mechanism.

DETAILED DESCRIPTION

Figure 3:
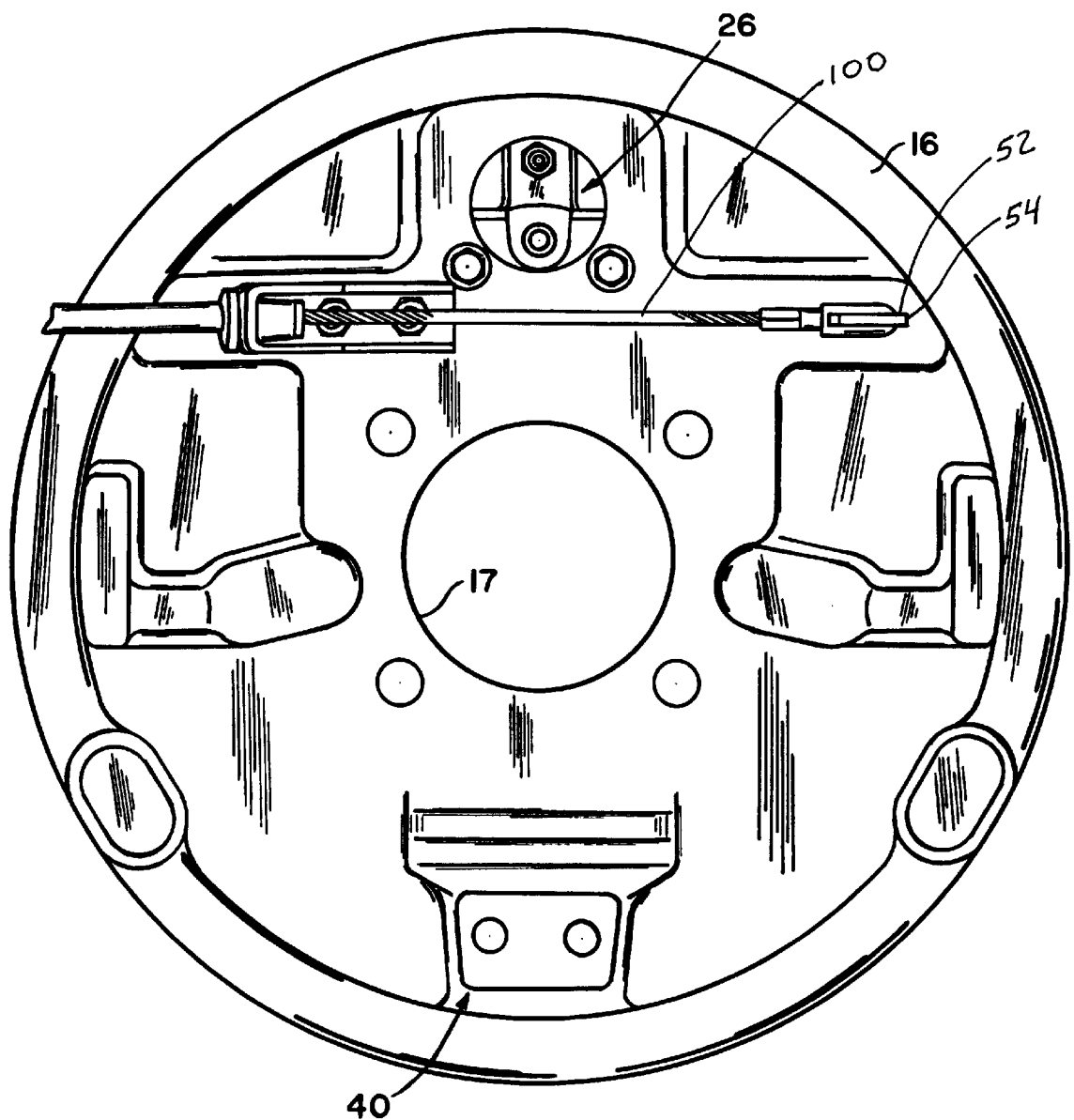
FIG. 3 is a schematic rear illustration of the drum brake of FIG. 1.

The drum brake 10 as shown in FIGS. 1 and 2 includes a backing plate 16 with an opening 17 for receiving an axle shaft of a vehicle. A hydraulic actuator assembly 26 is located at the top of the backing plate 16 and an anchor block 40 is aligned on the bottom of the backing plate 16. First 12 and second 14 brake shoes are retained on a backing plate 16 by first 18 and second 20 pins connected to a backing plate 16. Brake shoe 12 has a first end 22 and brake shoe 14 has a first end 24, respectively, connected to a hydraulic actuator assembly 26. Further brake shoe 12 has a second end 28 and brake shoes 14 has a second end 30, respectively, connected to anchor block 40 attached to the backing plate 16. An adjuster strut mechanism 32 of a type illustrated in U.S. Pat. Nos. 4,502,574 and 5,480,010 is located between the webs 13 and 15 of brake shoes 12 and 14 respectively, to maintain a predetermined running clearance between first 42 and second 44 friction pads and a drum 46. A first spring arrangement 48 is connected to the first 12 and second 14 brake shoes for respectively urging the second ends 28,30 toward the anchor post 40. A second spring arrangement 150 made up of a return spring 51 and an adjuster spring 53 urges the first ends 22,24 into engagement with the hydraulic actuator 26. A actuation input in the form of pressurized fluid supplied to hydraulic actuator 26 acts on and moves the first ends 22,24 outward to bring friction pads 42,44 into engagement with drum 46 to effect a first brake application during a service mode of operation.

The adjustable strut mechanism 32 includes a shaft 33 with a first end member 34 and a second end member 36 separated by a rotatable stem member 35. The stem member 35 has a first cylindrical surface 31 retained in the first end member 34, a second cylindrical surface 37 with a series of teeth thereon and a third cylindrical surface 39 with threads thereon which mate with corresponding threads in the second end member 36. An indexing lever 64 pivotally attached to web 13 of brake shoe 12 has a pawl 65 which cooperates with the teeth on the second cylindrical surface 37 to incrementally rotate stem member 35 and extend the length the adjustable strut mechanism 32 to maintain a desired clearance between the friction pads 42,44 and brake drum 46.

A mechanical actuator 50 is connected to the second end member 36 of the adjustable strut mechanism 32 to provide a manual input which moves the first ends 22,24 outward to bring friction pads 42,44 into engagement with drum 46 to effect a second or parking brake application.

In more particular detail, the second end member 36 of shaft 33 has an arm 80 which extends in a plane perpendicular to a slot 82. Slot 82 is parallel with and receives web 15 to hold pin 86 on arm 80 in a corresponding parallel plane. The second end member 36 is located on ledge 115 of web 15 of brake shoe 14 associated with slot 82 while the first end member 34 of the adjustable strut mechanism 32 is positioned in a slot 90 associated with ledge 91 in web 13 of brake shoe 12 to maintain shaft 33 in substantially horizontal plane. The first end member 34 and second end member 36 are maintained in a non-rotatable position while the rotatable stem 35 is indexed by the pawl 65 to change the length of the extendible shaft 33.

The mechanical actuator 50 includes a lever 52 which extends through a slot 19 in backing plate 16. The location of slot 19 defines a high level entry into the backing plate 16 which assists in maintaining the lever 52 away the bottom of a drum brake where it could be damaged by water, ice, rust and other contamination's. A first end 54 of lever 52 is connected to a cable 100 while a second end 56 is located in a plane perpendicular to the axial plane of the adjustable strut mechanism 32. Lever 52 has an opening for receiving pin 86 and a variable surface 58 in a tangential engagement with web 15 on brake shoe 12. The return spring 51 is connected to the second end 56 of lever 52 and web 13 of the first brake shoe 12. The second end 56 engages web 15 to define a stop for arm 80 a rest position for lever 52.

MODE OF OPERATION

In a service operation, hydraulic fluid is supplied to hydraulic actuator assembly 26 which responds by moving brake pads 42 and 44 into engagement with brake drum 46 to effect a brake application. On actuation, ends 22 and 24 of webs 13 move toward drum 46 while ends 28 and 30 pivot about and remain in contact with anchor block 40. When webs 13 and 15 move, spring 53 acts on indexing lever 64 to move pawl 65 with respect teeth 37 on stem member 35. When the end of pawl 65 moves a sufficient distance with respect to teeth 37, stem member 35 is rotated through the threaded connection to expand the length such that the operating clearance between friction pads 42,44 and drum 46 is maintained within a desired dimension. On termination of the hydraulic pressure to the actuator assembly 26, springs 48, 51 and 53 return or move the friction pads 42,44 back to a position of rest as defined by the desired clearance.

When an operator desires to effect a parking brake function, a manual input is applied to cable 100. This input is applied to the first end 54 of lever 52 which causes the second end 56 to pivot on pin 86 and define an axial force which is applied to web 15 through surface 58 and to web 13 through the first end 34 of the adjustable strut mechanism 32. The force moves the first 42 and second 44 brake pads into engagement with a drum 46 to effect a parking brake application. On termination of the input on cable 100, springs 48, 51 and 53 returns or repositions the first 42 and second 44 brake pads in a rest position.

In some applications, the second spring arrangement 150 is limited to a single spring having a first end connected to lever 64 and a second end connected to end 56 of lever 52. In this configuration, the single spring functions as both a return spring and an indexing spring.

The movement of webs 13 and 15 through the force of the hydraulic actuator 26 causes the pawl 65 to index with respect to teeth 37 on shaft 35 as end 56 is held against stop 85 during a service mode of operation while in the manual mode of operation, the axial force applied to webs 13 and 15 is directed through surface 58 into web 15 and end member 34 to web 13 to effect a brake application.

What is claimed is:

1. A drum brake assembly (10) having first (12) and second (14) brake shoes retained on a backing plate (16) by first (18) and second (20) pins, each of said first (12) and second (14) brake shoes having a first end (22,24) and a second end (28,30), said first ends (22,24) being connected to a hydraulic actuator assembly (26) secured to said backing plate (16) and said second ends (28,30) being connected to a an anchor block (40) secured to said backing plate (16), said first ends (22,24) being selectively spaced apart by an adjustable strut mechanism (32) having an extendable shaft (33) with first end (34) which engages said first brake shoe (12) adjacent said first end (22) and a second end (36) which engages said second brake shoe (14) adjacent said first end (24), first resilient means (48) for urging said first (12) and second (14) brake shoes toward said anchor block (40) and second resilient means (150) for urging said first (12) and second (14) brake shoes toward said hydraulic actuator assembly (26), said adjustable strut mechanism (32) having a length which establishes a predetermined running clearance between a first friction pad (42) associated with said first brake shoe (12), a second (44) friction pad associated with said second brake shoe (14) and a drum (46), said hydraulic actuator assembly (26) responding to a first input to respectively move said first (42) and second (44) friction pads into engagement with said drum (46) and effect a first brake application and a mechanical actuator (50) connected to said first (12) and second (14) brake shoes for providing a second input to respectively move said first (42) and second (44) friction pads into engagement with said drum (46) and effect a second brake application, said mechanical actuator (50) being characterized by said extendable shaft (33) having a shaft (33) with a first end (34) separated from a second end (36) by a rotatable stem (35), said rotatable stem (35) having a first cylindrical surface (31) retained in a bore in said first end (34), a second cylindrical surface (37) which engages said first end (34) and a third cylindrical surface (39) with threads thereon which mate with threads in said second end (36), said first end (34) having a slot (90) for receiving a web (13) of said first brake shoe (13) to prevent said first end (34) from rotating, said second end (34) having a slot (82) for receiving a web (15) of said second brake shoe (14) to prevent said second end (36) from rotating, said second end (34) having an arm (80) which extends in a plane substantially perpendicular to said slot (82), and in that said mechanical actuator (50) is characterized by a lever (52) having a first end (54) and a second end (56), said lever (52) being pivotally attached to said arm (80) in a plane substantially parallel with said web (15), said lever (52) having a variable surface (58) adjacent said second end (56) which engages said web (15), said first end (54) of said lever (52) on receiving said second input responding by rotating about said pivotal connection on said arm (80) to transmit an axial force through said variable surface (58) to said second brake shoe (14) by way of web (15) and through said adjustable strut mechanism (32) to said first brake shoe (12) by way of web (13) to effect said second brake application.

2. The drum brake assembly as recited in claim 1 wherein said second resilient means (150) is characterized by a return spring (51) connected to said second end (56) of said lever (52) and to said first brake shoe (12) and a second spring (53) connected to an indexing lever (64) associated with said extendable shaft (33) and to said second brake shoe (14), said return spring (51) acting on said lever (52) to return said second end (56) to a rest position on termination of said second input while said second spring (53) acts on said indexing lever to provide an input acting on said second cylindrical surface (37) to incrementally rotate said stem (35) of said extendable shaft (33) to maintain said predetermined running clearance.

3. The drum brake as recited in claim 2 wherein said lever (52) extends through a slot (19) in said backing plate (16), said slot (19) being in a plane substantially perpendicular to said extendable shaft (33) such that said second input is applied in an axial plane.

4. The drum brake as recited in claim 3 wherein said second end (56) of said lever (52) engages a web (15) of said second brake shoe to define a rest position for said lever (52).

5. The drum brake as recited in claim 6 wherein said lever (52) lever is characterized by said second end (56) which engages said web (15) of said second brake shoe (14) to define a rest position for said lever (52).

* * * * *